(12) United States Patent
Kondos et al.

(10) Patent No.: US 8,765,853 B2
(45) Date of Patent: Jul. 1, 2014

(54) COATING COMPOSITIONS AND METHODS FOR IMPROVING THE ADHESION OF COATINGS TO POLYMERIC SUBSTRATES

(75) Inventors: Constantine A. Kondos, Pittsburgh, PA (US); Michael P. Makowski, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1353 days.

(21) Appl. No.: 12/059,149

(22) Filed: Mar. 31, 2008

(65) Prior Publication Data

US 2008/0248210 A1 Oct. 9, 2008

Related U.S. Application Data

(60) Provisional application No. 60/910,043, filed on Apr. 4, 2007.

(51) Int. Cl.
*C08G 73/10* (2006.01)
*C08K 5/13* (2006.01)
*H01B 3/30* (2006.01)
*A63B 37/00* (2006.01)
*C08K 3/18* (2006.01)
*C08K 3/22* (2006.01)

(52) U.S. Cl.
USPC ............................. 524/323; 524/352; 524/432

(58) Field of Classification Search
USPC .......................................... 524/323, 352, 432
See application file for complete search history.

(56) References Cited

U.S. PATENT DOCUMENTS

| | | | |
|---|---|---|---|
| 3,726,752 A | 4/1973 | Provost | 161/67 |
| 3,914,472 A | 10/1975 | Nakanishi et al. | 427/250 |
| 4,195,140 A | 3/1980 | Sexsmith et al. | 525/523 |
| 4,422,671 A * | 12/1983 | Cespon | 503/210 |
| 4,503,174 A * | 3/1985 | Vasta | 523/439 |
| 4,961,967 A | 10/1990 | Pluddemann | 427/302 |
| 5,178,938 A | 1/1993 | Magistro et al. | 428/252 |
| 5,709,984 A | 1/1998 | Chen et al. | 430/527 |
| 5,887,345 A | 3/1999 | Kulesza et al. | 29/852 |
| 6,881,492 B2 | 4/2005 | Rao et al. | 428/483 |
| 2006/0068147 A1 | 3/2006 | De Cooman et al. | 428/41.5 |
| 2007/0066757 A1 * | 3/2007 | Corcoran et al. | 525/194 |

FOREIGN PATENT DOCUMENTS

| | | |
|---|---|---|
| EP | 0 244 078 A | 11/1987 |
| EP | 0 287 271 A | 10/1988 |
| JP | 10338833 A | 12/1998 |
| JP | 2004215346 A | 7/2004 |
| WO | WO 83/03832 | 11/1983 |
| WO | WO 01/09261 A1 | 2/2001 |

OTHER PUBLICATIONS

Nylon Plastics Handbook, edited by Melvin I. Kohan, Hanser/Gardner Publications, Inc., Cincinnati, Ohio, 1995, Section 3.7 Chemical Attack, pp. 62-67.

* cited by examiner

*Primary Examiner* — Angela C Scott
(74) *Attorney, Agent, or Firm* — William E Kuss

(57) ABSTRACT

Disclosed are coating compositions suitable for application to polymeric substrates. The coating compositions include: (a) a film-forming resin; (b) a non-volatile chemical etchant; and (c) a solubilizing agent.

34 Claims, No Drawings

COATING COMPOSITIONS AND METHODS FOR IMPROVING THE ADHESION OF COATINGS TO POLYMERIC SUBSTRATES

CROSS-REFERENCE TO RELATED APPLICATIONS

This application claims the benefit of U.S. Provisional Patent Application Ser. No. 60/910,043, filed Apr. 4, 2007.

FIELD OF THE INVENTION

The present invention relates to coating compositions. More particularly, the present invention relates to coating compositions that include: (a) a film-forming resin; (b) a non-volatile chemical etchant; and (c) a solubilizing agent.

BACKGROUND OF THE INVENTION

Polymeric materials, such as polyamides, are used in many applications, such as in the manufacture of automobile parts and accessories, containers, consumer electronics devices, household appliances and other commercial items. More recently, polyamides reinforced with, for example, glass fibers, are being used in the construction of such articles. This reinforcement increases the rigidity, strength, and/or heat resistance of the polyamide, thereby providing a material that is more desirable in many applications.

It is often desired to coat articles made from such materials with one or more coatings to decorate and/or protect a surface thereof from degradation when exposed to, for example, atmospheric weathering conditions, such as sunlight, moisture, heat and cold. To achieve longer lasting and more durable parts, it is desirable that such coatings adhere well to the article surface.

In many cases, an adhesion-promoting layer is used on polymeric substrates, such as polyamide substrates, to improve the adhesion of subsequent applied coatings thereto. In many cases, these adhesion-promoting layers are formed from compositions that include chlorinated polyolefins and/or epoxy-amine chemistries. Unfortunately, the adhesion performance of such layers has not always been reliable, particularly when they have been applied to reinforced polyamide substrates of the type described above.

As a result, it would be desirable to provide coating compositions that are capable of providing coatings that adhere to polymeric substrates, including reinforced polyamide substrates, and which are suitable for the application of subsequent coatings.

SUMMARY OF THE INVENTION

In certain respects, the present invention is directed to coating compositions comprising: (a) a film-forming resin; (b) a non-volatile chemical etchant; and (c) a solubilizing agent.

In certain respects, the present invention is directed to coating compositions suitable for application to a polymeric substrate, such as a polyamide substrate, wherein the coating compositions comprise: (a) a film-forming resin; (b) a non-volatile chemical etchant; and (c) a solubilizing agent, wherein each of components (b) and (c) and the substrate are selected so as to result in a Y value of no more than 2, wherein Y is calculated according to the following equation:

$$Y = -29.7 + (0.28 \times A) + (-15.75 \times B) + (0.16 \times (A \times C)) + (0.30 \times (D \times E)), \text{ wherein:}$$

A is the molecular weight of the solubilizing agent; B is the pair interaction energy between the solubilizing agent and the substrate; C is the pair interaction energy between the non-volatile chemical etchant and the solubilizing agent; D is the number of lone pair electrons in the solubilizing agent; and E is the pair interaction energy between the non-volatile chemical etchant and the substrate.

In other respects, the present invention is directed to methods for improving the adhesion of a coating to a polymeric substrate, such as a polyamide substrate, including a reinforced polyamide substrate. These methods comprise: (a) depositing a first coating directly to at least a portion of the substrate, wherein the first coating is deposited from a coating composition comprising: (i) a film-forming resin; (ii) a non-volatile chemical etchant; and (iii) a solubilizing agent; and (b) depositing a second coating directly over at least a portion of the first coating.

The present invention is also directed to, inter alia, related coated substrates.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, moieties in a general chemical formula and quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Certain embodiments of the present invention are directed to coating compositions. More particularly, certain embodiments of the present invention are directed to coating compositions that are capable of providing coatings that adhere to polymeric substrates, such as polyamide substrates, including reinforced polyamide substrates.

As used herein, the term "polyamide substrate" refers to a substrate constructed from a polymer that includes repeating units of the formula:

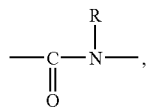

wherein R is hydrogen or an alkyl group. The polyamide may be any of a large class of polyamides based on aliphatic, cycloaliphatic, or aromatic groups in the chain. They may be formally represented by the products of condensation of a dibasic amine with a diacid and/or diacid chloride, by the product of self-condensation of an amino acid, such as omega-aminoundecanoic acid, or by the product of a ring-opening reaction of a cyclic lactam, such as caprolactam, lauryllactam, or pyrrolidone. They may contain one or more alkylene, arylene, or aralkylene repeating units. The polyamide may be crystalline or amorphous. In certain embodiments, the polyamide substrate comprises a crystalline polyamide of alkylene repeating units having from 4 to 12 carbon atoms, such as poly(caprolactam), known as nylon 6, poly (lauryllactam), known as nylon 12, poly(omega-aminoundecanoic acid), known as nylon 11, poly(hexamethylene adipamide), known as nylon 6.6, poly(hexamethylene sebacamide), known as nylon 6.10, and/or an alkylene/arylene copolyamide, such as that made from meta-xylylene diamine and adipic acid (nylon MXD6). Amorphous polyamides, such as those derived from isophoronediamine or trimethylcyclohexanediamine, may also be utilized. Examples of such amorphous polyamides include Grilamid® TR grades, such as TR 55 and TR 90, which are transparent amorphous thermoplastics commercially available from EMS-Chemie Inc., Sumter, S.C. Blends of polyamides may also be utilized.

As used herein, the term "reinforced polyamide substrate" refers to a polyamide substrate constructed from a polyamide that has been reinforced through the inclusion of, for example, fibrous materials, such as glass fiber or carbon fiber, or inorganic fillers, such as calcium carbonate, to produce a polyamide having increased rigidity, strength, and/or heat resistance relative to a similar polyamide that does not include such reinforcing materials. Reinforced polyamides, which are suitable for use as a substrate material in accordance with certain embodiments of the present invention, are commercially available and include, for example, those materials commercially available from Solvay Advanced Polymers under the IXEF® name and, include, for example, the IXEF 1000, 1500, 1600, 2000, 2500, 3000 and 5000 series products; from EMS-Chemie Inc., Sumter, S.C., under the Grilamid®, Grivory®, Grilon® and Grilflex® tradenames; and DuPont Engineered Polymers, such as those sold under the Thermx® and Minlon® tradenames.

As indicated, in certain embodiments, the coating compositions of the present invention comprise a film-forming resin. As used herein, the term "film-forming resin" refers to resins that can form a self-supporting continuous film on at least a horizontal surface of a substrate upon removal of any diluents or carriers present in the composition or upon curing at ambient or elevated temperature.

The coating compositions of the present invention may comprise any of a variety of thermoplastic and/or thermosetting film-forming resins known in the art. Moreover, such coating compositions may be water-based or solvent-based liquid composition.

Suitable film-forming resins for inclusion in coating compositions of the present invention include, without limitation, those typically used in automotive OEM coating compositions, automotive refinish coating compositions, industrial coating compositions, architectural coating compositions, coil coating compositions, and aerospace coating compositions, among others.

In certain embodiments, the coating compositions of the present invention comprise a thermoplastic film-forming resin. As used herein, the term "thermoplastic film-forming resin" refers to resins that comprise polymeric components that are not joined by covalent bonds and thereby can undergo liquid flow upon heating and are soluble in solvents.

Suitable thermoplastic film-forming resins include, but are not limited to, thermoplastic polyolefins, such as polyethylene, polypropylene, polyamides, such as nylon, thermoplastic polyurethanes, thermoplastic polyesters, acrylic polymers, vinyl polymers, polycarbonates, acrylonitrile-butadiene-styrene ("ABS") copolymers, ethylene propylene diene terpolymer ("EPDM") rubber, copolymers, and mixtures of any of the foregoing. In certain embodiments, the thermoplastic film-forming resin comprises a halogenated polyolefin, such as a chlorinated polyolefin, including, for example, a chlorinated polyolefin selected from at least one of chlorinated polypropylene; chlorinated polyethylene, chlorinated ethylene-vinyl acetate copolymer, for example, ethylene-vinyl acetate-vinyl chloride copolymer, mixtures thereof and copolymers thereof.

In certain embodiments, the film-forming resin included in the coating composition of the present invention comprises a thermosetting film-forming resin. As used herein, the term "thermosetting" refers to film-forming resins that "set" irreversibly upon curing or crosslinking, wherein the polymer chains of the polymeric components are joined together by covalent bonds. This property is usually associated with a crosslinking reaction of the composition constituents often induced, for example, by heat or radiation, or, in some cases, such a reaction is carried out under ambient conditions. Once cured or crosslinked, a thermosetting resin will not melt upon the application of heat and is insoluble in solvents.

Suitable thermosetting film-forming resins include, for example, acrylic polymers, polyvinyl polymers, phenolics, polyester polymers, polyurethane polymers, polyamide polymers, polyether polymers, polysiloxane polymers, copolymers thereof, and mixtures thereof. Generally these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof.

The thermosetting film-forming resins typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing.

In certain embodiments, the coating compositions of the present invention comprise a film-forming resin that comprises radiation curable functional group(s). As used herein, the term "radiation curable functional group(s)" refers to any functional group that can react such as via an addition reaction, upon exposure to actinic radiation, such as ultraviolet radiation or electron beam radiation. Examples of such groups include but are not limited to acrylates, methacrylates, vinyl ethers, ethylenically unsaturated resins, maleic unsaturated polyesters, fumarates, thiols, alkenes, epoxies and the like.

Appropriate mixtures of film-forming resins may also be used in the preparation of the coating compositions of the present invention.

As previously indicated, the coating compositions of the present invention comprise a non-volatile chemical etchant. As used herein, the term "chemical etchant" refers to materials that chemically attack or "etch" or plasticize polyamides. As will be appreciated, such materials include highly polar chemicals, such as alcohols, phenols, acids, and solutions of metal salts. See Nylon Plastics Handbook (Kohan, Hanser/Gardner Publications, Inc., Cincinnati, 1995, pages 62-67).

It has been discovered, however, that only certain "chemical etchants" are useful for providing coating compositions that are capable of producing coatings that adhere well to reinforced polyamide substrates. As a result, the coating compositions of the present invention comprise a "non-volatile" chemical etchant. As used herein, the term "non-volatile" refers to chemical etchants that are not significantly removed from the composition after the composition is deposited upon a substrate which is then exposed to a temperature of 180° F. for at least 30 minutes. By "not significantly removed" it is meant that no more than 10% by weight, such as no more than 5% by weight, or, in some cases, no more than 2.5% by weight of the chemical etchant is removed from the composition upon exposure to such conditions.

In certain embodiments, the non-volatile chemical etchant utilized in the coating compositions of the present invention comprises a non-volatile aromatic compound comprising an aromatic ring substituted with at least one hydroxy group and/or a hydroxy substituted substituent group. Examples of non-volatile chemical etchants, which are suitable for use in the present invention, are the various isomers of benzenediol, such as 1,3 benzenediol, i.e., resorcinol, 1,2 benzenediol, benzenetriol, and the various isomers of 4-methoxyphenol.

In certain embodiments, the non-volatile chemical etchant utilized in the coating compositions of the present invention comprises an inorganic metal salt, such as a chloride of Zn, Co(II), Cu(II), and/or Mn(II) and/or a thiocyanate of Zn and Co(II).

Mixtures of any of the above-described non-volatile chemical etchants may also be used.

In certain embodiments, the non-volatile chemical etchant is present in the coating composition in an amount of 1 to 99 percent by weight, such as 15 to 65 percent by weight, with the weights percents being based on the total weight of resin solids in the coating composition.

In addition to the non-volatile chemical etchant, the coating compositions of the present invention also comprise a solubilizing agent. It should be noted that it has been discovered that the use of a non-volatile chemical etchant in the coating compositions of the present invention, in the absence of a suitable solubilizing agent, has not shown to as effective in producing a coating that is capable of adhering to reinforced polyamide substrates. As used herein, the term "solubilizing agent" refers to a material that is capable of dissolving the non-volatile chemical etchant and producing a mixture of the film-forming resin and non-volatile chemical etchant that is a clear solution at ambient or elevated temperatures. In particular, it has been discovered that solubilizing agents that are suitable for use in the present invention include those materials that are capable of maintaining the non-volatile chemical etchant in a solubilized form within the coating composition for a sufficient period of time to allow the etchant to diffuse into a polymeric substrate, such as a reinforced polyamide substrate to an extent sufficient to provide a coating that adheres to such a substrate.

Specific examples of solubilizing agents that are suitable for use in the coating compositions of the present invention are benzyl alcohol, cyclohexanone, ethyl ethoxy propionate, dibasic esters, such as Ectasol DBE, commercially available from Aceto Corp., Lake Success, N.Y., water, and certain (meth)acrylates, such as 1,6-hexanediol diacrylate. As used herein, the term "(meth)acrylate" is intended to refer to both acrylates and methacrylates.

In certain embodiments of the coating compositions of the present invention, the non-volatile chemical etchant and the solubilizing agent are present in an amount such that the solubilizing agent is capable of dissolving the non-volatile chemical etchant as described above. In certain embodiments, the solubilizing agent and the non-volatile chemical etchant are present in a weight ratio of at least 1:1, in some cases, 1.5:1, and, in yet other cases, at least 2:1, in still other cases, at least 4:1.

In certain embodiments of the coating compositions of the present invention, the non-volatile chemical etchant and the solubilizing agent are not caused to react with one another. For example, in these embodiments, the coating composition does not include a catalyst to promote any reaction between the solubilizing agent and the non-volatile chemical etchant and/or the solubilizing agent and the non-volatile chemical etchant are not combined under conditions that would promote such a reaction. Thus, in these embodiments of the present invention, the non-volatile chemical etchant and the solubilizing agent are predominantly unreacted, i.e., the majority of these components have not reacted with each other, at the time that the coating composition is deposited upon a polymeric substrate.

In certain embodiments of the coating compositions of the present invention, the non-volatile chemical etchant, the solubilizing agent and the substrate are selected so as to result in a Y value of no more than 2, in some cases no more than 1.6, and, in yet other cases, no more than 1.2 wherein Y is calculated according to the following equation (I):

$$Y = -29.7 + (0.28 \times A) + (-15.75 \times B) + (0.16 \times (A \times C)) + (0.30 \times (D \times E)). \quad (I)$$

In the foregoing equation, A is the molecular weight of the solubilizing agent; B is the pair interaction energy between the solubilizing agent and the substrate; C is the pair interaction energy between the non-volatile chemical etchant and the solubilizing agent; D is the number of lone pair electrons in the solubilizing agent; and E is the pair interaction energy between the non-volatile chemical etchant and the substrate. As used herein, the term "lone pair electrons" means electron pairs in the outermost shell of an atom that are not used in bonding and, which, in certain circumstances, allow the atom to bond with atoms, ions, or molecules that are deficient in electrons, forming coordinate covalent bonds in which they provide both of the bonding electrons.

In developing a mathematical model for identifying combinations of non-volatile chemical etchants and solubilizing agents suitable for use in the present invention, pair interaction energies for each binary combination of non-volatile chemical etchant, solubilizing agent and substrate were computed. Pair interaction energies, sometimes called binding energies, can be described as a measure of the thermodynamic attraction or repulsion between two chemical species when brought into close proximity, for example, in a solution, blend or bulk material. Given a set of three species designated as "a", "b" and "c", the following pair interaction energies may be defined to identify the two species in the pair under consideration: $E_{ab}$, $E_{ac}$ and $E_{bc}$. For purposes of the present invention, $E_{ab}$ refers to the pair interaction energy between the non-volatile chemical etchant and the solubilizing agent, $E_{ac}$ refers to the pair interaction energy between the non-volatile chemical etchant and the substrate, and $E_{bc}$ refers to the pair interaction energy between the solubilizing agent and the substrate.

In a system containing multiple species, it is believed that these pair interaction energies describe which combinations of species resulting in the most favorable thermodynamic interactions. Pair interaction energies are determined through molecular simulations wherein pairs of chemical compounds are brought into close proximity using a Monte Carlo packing algorithm that samples the three dimensional spatial configurations available to each participant and pairs of participants. Total potential energies of the pairs are evaluated using force-field based classical mechanics methods to determine a distribution function of energies over a given ensemble of pair configurations. For purposes of the present invention, the pair interaction energies are determined using the Blends Module of the Materials Studio® version 4.1.0.0 software, commercially available from Accelrys Software Inc., San Diego Calif. Within the Blends Module, the Binding Energies option is selected, which yields a table of pair interaction energies for each set of user defined input species. The Compass version 2.6 force field is chosen for energy calculations, and employs atom-based summations for both the electrostatic and van der Waals non-bonded potential energy terms. Atomic charges were force-field assigned using Compass version 2.6 parameters. The option for "fine" quality calculations is chosen, which results in sampling over an ensemble of 1,000,000 pairs for each pair interaction energy determination.

For purposes of computing the pair interaction energies, molecular models are required as inputs into the Blends Module. All molecular models are constructed using the Building Tools supplied within Materials Studio version 4.1.0.0 software and then submitted for geometry optimizations using the Discover molecular mechanics code within Materials Studio. The Compass version 2.6 force field is chosen for geometry optimization calculations within Discover, and employed atom-based summations for both the electrostatic and van der Waals non-bonded potential energy terms. Atomic charges were force-field assigned using Compass version 2.6 parameters.

In the case of the etchant and the solubilizing agent, molecular models are taken as full representations for the materials. In the case of the substrates, which are bulk materials, model compounds are used to compute pair interaction energies. Model compounds for the substrates are taken as hydrogen terminated polymer repeat unit structures for the particular substrate. For example, in the specific case of computing pair interaction energies for di-hydroxy benzene as the etchant, benzyl alcohol as the solubilizing agent, and nylon 6,6 as the substrate, the following molecular models are used as inputs:

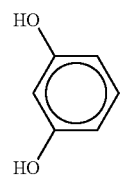

for dihydroxyl benzene (species "a");

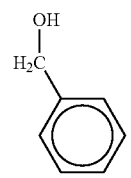

for benzyl alcohol (species "b"); and

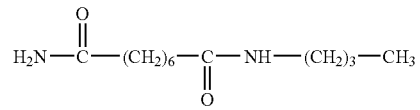

for the hydrogen terminated polymer repeat unit of Nylon 6,6 (species "c").

From these inputs, the output from the resulting binding energy calculations using the Blends Tool for this particular set of materials yields the following values (given in units of kcal/mol):

| a | B | c |
|---|---|---|
| resorcinol | benzyl alcohol | nylon-6-6 |
| $E_{ab}$ | $E_{ac}$ | $E_{bc}$ |
| −2.64 | −3.36 | −3.09 |

These pair interaction energy values, along with the molecular weight of the solubilizing agent (in this case 108.14 g/mole) and the number of lone pair electrons on the solubilizing agent (in this case 2) are then used as inputs into equation I.

The coating compositions of the present invention may include other components, such as solvents, plasticizers, extenders, fillers, hydrocarbon resin modifiers, and various types of additives such as UV stabilizers, pigment wetting agents, flow and leveling additives, thixatropes, defoamers and the like. Organic solvents can be added if desired. Suitable solvents include esters, ethers, alcohols, ketones, glycols and the like. In certain embodiments, the coating compositions of the present invention comprise up to 25 percent by weight organic solvent, based on the total weight of the coating composition.

In certain embodiments, the coating compositions of the present invention comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or colorchange. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

In certain embodiments, the coating compositions of the present invention are substantially free, or, in some cases, completely free, of a vanadium oxide gel. In certain embodiments, the coating compositions of the present invention are substantially free, or, in some cases, completely free, of an organosilicon compound and/or an alkoxymethyltriazine. In certain embodiments, the coating compositions of the present invention are substantially free, or, in some cases, completely free, of a triisocyanate. In certain embodiments, the coating compositions of the present invention are substantially free, or, in some cases, completely free, of a polyethyleneimine.

As used herein, when it is stated that a coating composition of the present invention is "substantially free" of a particular material, it means that the material being discussed is present in the composition, if at all, as an incidental impurity. In other words, the material does not affect the properties of the composition. Moreover, when it is stated that a coating composition of the present invention is "completely free" of a particular material it means that the material being discussed is not present in the composition at all.

As indicated, the coating compositions of the present invention, in certain embodiments, are capable of producing a coating that adheres to a polymeric substrates, such as a polyamide substrate, include a reinforced polyamide substrate. As used herein, the phrase "adheres" means that at least 85% of the coating adheres to the substrate when measured using a crosshatch adhesion test conducted 1 day after the coating is applied and cured and 7 days after the coating is applied and cured. The crosshatch adhesion test is conducted according to ASTM Test Method D 3359 Method B using a multi-blade cutter (commercially available from Paul N. Gardner Co., Inc.), wherein the coated substrate is scribed at least twice (at 90° angle), making sure the blades cut through all coating layers into the substrate, and adhesion is measured using 610 tape (3M Corp.) and/or Nichiban L-24 tape (four pulls of 610 tape and three pulls Nichiban L-24 tape at 90°).

Moreover, in certain embodiments, the coating compositions of the present invention are capable of producing a coating that is humidity resistant. As used herein, when it is stated that a coating is "humidity resistant" it means that at least 85% of the coating adheres to a substrate when measured using a crosshatch adhesion test, as described above, conducted following exposure of the coated substrate to elevated temperature (~65° C.) and humidity (~90%) for 48 hours.

As a result, the present invention is also directed to coating compositions, as previously described, wherein the composition, when applied to at least a portion of a polymeric substrate, such as a polyamide substrate, in some cases a reinforce polyamide substrate, and cured, produces a coating that adheres to the substrate and/or is humidity resistant.

The coating compositions of the present invention may be used as a single coating, a clear top coating, a base coating in a two-layered system, or one or more layers of a multi-layered system including a clear top coating composition, colorant layer and base coating composition, or as a primer layer.

As previously indicated, in certain embodiments, the coating compositions of the present invention are used as a primer layer on polymeric substrates, such as polyamide substrates, including reinforced polyamide substrates. In these embodiments, the coating compositions of the present invention may be used as part of a multi-component composite coating, such as a "color-plus-clear" coating system, which includes at least one pigmented or colored base coat and at least one clear topcoat. As a result, the present invention is also directed to multi-component composite coatings, wherein at least one coating layer is deposited from a composition comprising a coating composition of the present invention.

In such embodiments, the coating composition of the base coat and/or clear topcoat in the multi-components composite coating may comprise any composition useful in coatings applications, such as those typically used in automotive OEM applications, automotive refinish applications, industrial coating applications, architectural coating applications, electrocoating applications, powder coating applications, coil coating applications, and aerospace coating applications, among others. The coating composition of the base coat and/or clear topcoat typically comprises a resinous binder. Particularly useful resinous binders include, for example, acrylic polymers, polyesters, including alkyds, and polyurethanes, among others.

In certain embodiments, the present invention is directed to methods for improving the adhesion of a coating to a polymeric substrate, including a polyamide substrate, such as a reinforced polyamide substrate. These methods comprise: (a) depositing a first coating directly to at least a portion of the substrate, wherein the first coating is deposited from a coating composition comprising: (i) a film-forming resin; (ii) a non-volatile chemical etchant; and (iii) a solubilizing agent. In certain embodiments, each of components (ii) and (iii) and the substrate are selected so as to result in a Y value of no more than 2, wherein Y is calculated according to the following equation:

$$Y = -29.7 + (0.28 \times A) + (-15.75 \times B) + (0.16 \times (A \times C)) + (0.30 \times (D \times E)), \text{ wherein:}$$

A is the molecular weight of the solubilizing agent; B is the pair interaction energy between the solubilizing agent and the substrate; C is the pair interaction energy between the non-volatile chemical etchant and the solubilizing agent; D is the number of lone pair electrons in the solubilizing agent; and E is the pair interaction energy between the non-volatile chemical etchant and the substrate; and (b) depositing a second coating directly over at least a portion of the first coating. As used herein, when it is stated that a coating layer is deposited "directly" to or "directly" over another material, it means that the coating layer is in contact with the other material and there are no intervening layers present that separate the coating layer from the other material.

Illustrating the invention are the following examples that are not to be considered as limiting the invention to their details. All parts and percentages in the examples, as well as throughout the specification, are by weight unless otherwise indicated.

EXAMPLE 1

A 1-component coating composition was prepared by mixing, in a 2 oz. Jar, 4 parts of XPB22362VS Spectracron SAC9000 Kowloon Black Basecoat with 4 parts of XPS90030 Durethane Solvent Reducer, both available from PPG Industries. The 2 oz. jar was then sealed and the contents mixed vigorously for ~1 minute. The solution was compatible and free of any particulates.

Using a plastic pipette, the preceding mixture was smeared onto nylon test panels, IXEF 1622 and IXEF1022, commercially available from Solvay Advanced Polymers, Oudenaarde, Belgium, that had previously been wiped with isopropanol and allowed to dry thoroughly. The coated sample was allowed to air-flash for 5 minutes at room temperature, and then placed into a 180° F. oven for 30 minutes. The sample was then removed, and allowed to air cool until it reached room temperature, prior to testing.

EXAMPLE 2

A 1-component coating composition was prepared as follows: In Step 1, a mixture of 1 part resorcinol and 2 parts benzyl alcohol was prepared in a 2 oz. jar. The jar was sealed and hand mixing was required to dissolve the resorcinol into the benzyl alcohol. The solution was clear after 15 minutes of hand-shaking. In Step 2, a mixture of 4 parts of XPB22362VS Spectracron SAC9000 Kowloon Black Basecoat and 4 parts of XPS90030 Durethane Solvent Reducer, both available from PPG Industries, was prepared in a 2 oz. jar. The 2 oz. jar was then sealed and the contents mixed vigorously for ~1 minute. In Step 3, 1.5 parts of the mixture of Step 1 was added to 8 parts of the mixture of Step 2 and the resulting mixture was vigorously shaken for ~1 minute. The solution was compatible and free of any particulates.

Using a plastic pipette, the preceding mixture was smeared onto IXEF 1622 and IXEF1022 nylon test panels that had previously been wiped with isopropanol and allowed to dry thoroughly. The coated sample was allowed to air-flash for 5 minutes at room temperature, and then placed into a 180° F. oven for 30 minutes. The sample was then removed, and allowed to air cool until it reached room temperature, prior to testing.

EXAMPLE 3

A 1-component coating composition was prepared by mixing, in a 2 oz. Jar, 10 parts of XPB21920VS Licorice Black Basecoat with 10 parts of XPS90030 Durethane Solvent Reducer and 1 part of XPH80002, each available from PPG Industries. The 2 oz. jar was then sealed and the contents mixed vigorously for ~1 minute.

Using a Binks 95 gun, with a line pressure of 50 psi, the preceding mixture was spray applied onto IXEF 1622, IXEF1022 and Grivory GV-5H (commercially available from EMS-Chemie, Sumter, S.C.) nylon test panels that had previously been wiped with isopropanol and allowed to dry thoroughly. The coated sample was allowed to air-flash for 5 minutes at room temperature, and then placed into a 180° F. oven for 15 minutes. The dry film build was 0.50 mils. The sample was then removed, and allowed to air cool until it reached room temperature, prior to clearcoat application.

A SPU30019 Soft-Touch clearcoat system, available from PPG Industries, was then hand spray applied over the basecoat, using a Binks 95 gun, with a line pressure of 50 psi, to a dry film build of ~1.80 mils. The coated sample was air dried for 5 minutes and then placed into a 180° F. oven for 30 minutes. The complete system was then removed from the oven and cooled to ambient temperature.

EXAMPLE 4

A 1-component coating composition was prepared as follows: In Step 1, a mixture of 1 part resorcinol and 2 parts benzyl alcohol was prepared in a 2 oz. jar. The jar was sealed and hand mixing was required to dissolve the resorcinol into the benzyl alcohol. The solution was clear after 15 minutes of hand-shaking. In Step 2, a mixture of 10 parts of XPB21920VS Licorice Black Basecoat with 10 parts of XPS90030 Durethane Solvent Reducer and 1 part of XPH80002, each available from PPG Industries, was prepared in a 2 oz. jar. The 2 oz. jar was then sealed and the contents mixed vigorously for ~1 minute. In Step 3, 3.5 parts of the mixture of Step 1 was added to 21 parts of the mixture of Step 2 and the resulting mixture was vigorously shaken for ~1 minute. The solution was compatible and free of any particulates.

Using a Binks 95 gun, with a line pressure of 50 psi, the preceding mixture was spray applied onto IXEF 1622, IXEF1022 and Grivory GV-5H nylon test panels that had previously been wiped with isopropanol and allowed to dry thoroughly. The coated sample was allowed to air-flash for 5 minutes at room temperature, and then placed into a 180° F. oven for 15 minutes. The dry film build was 0.50 mils. The sample was then removed, and allowed to air cool until it reached room temperature, prior to clearcoat application.

A SPU30019 Soft-Touch clearcoat system was then hand spray applied over the basecoat, using a Binks 95 gun, with a line pressure of 50 psi, to a dry film build of ~1.80 mils. The coated sample was air dried for 5 minutes and then placed into a 180° F. oven for 30 minutes. The complete system was then removed from the oven and cooled to ambient temperature.

EXAMPLE 5

A 1-component coating composition was prepared as described in Example 1.

Using a Binks 95 gun, with a line pressure of 50 psi, the preceding composition was spray applied onto IXEF 1622, IXEF1022 and Grivory GV-5H nylon test panels that had previously been wiped with isopropanol and allowed to dry thoroughly. The coated sample was allowed to air-flash for 5 minutes at room temperature, and then placed into a 180° F. oven for 15 minutes. The dry film build was 0.50 mils. The sample was then removed, and allowed to air cool until it reached room temperature, prior to clearcoat application.

An XPC700031 U.V. High Gloss clearcoat system, commercially available from PPG Industries, was then hand spray applied over the basecoat, using a Binks 95 gun, with a line pressure of 50 psi, to a dry film build of ~0.45 mils. The coated sample was air dried for 5 minutes and then placed into a 140° F. oven for 10 minutes. The complete system was then removed from the oven and placed into a U.V. Cure unit with an energy intensity of ~750 mJ/cm and power intensity of ~450 mW/cm.

EXAMPLE 6

A 1-component coating composition was prepared as described in Example 2.

Using a Binks 95 gun, with a line pressure of 50 psi, the preceding composition was spray applied onto IXEF 1622, IXEF1022 and Grivory GV-5H nylon test panels that had previously been wiped with isopropanol and allowed to dry thoroughly. The coated sample was allowed to air-flash for 5 minutes at room temperature, and then placed into a 180° F. oven for 15 minutes. The dry film build was 0.50 mils. The sample was then removed, and allowed to air cool until it reached room temperature, prior to clearcoat application.

An XPC700031 U.V. High Gloss clearcoat system was then hand spray applied over the basecoat, using a Binks 95 gun, with a line pressure of 50 psi, to a dry film build of ~0.45 mils. The coated sample was air dried for 5 minutes and then placed into a 140° F. oven for 10 minutes. The complete system was then removed from the oven and placed into a U.V. Cure unit with an energy intensity of ~750 mJ/cm and power intensity of ~450 mW/cm.

EXAMPLE 7

A 2-component coating composition was prepared by mixing, in a 2 oz. Jar, 10 parts of DP90LF with 5 parts of DP401LF, both commercially available from PPG Industries. The 2 oz. jar was then sealed and the contents mixed vigorously for ~1 minute. The solution was compatible and free of any particulates.

Using a Binks 95 gun, with a line pressure of 50 psi, the preceding composition was spray applied onto IXEF 1622, IXEF1022, Grivory GV-5H, and Zytel HTN53G50HSLR (commercially available from E.I. du Pont de Nemours and Company, Wilmington, Del.) nylon test panels that had previously been wiped with isopropanol and allowed to dry thoroughly. The coated sample was allowed to air-flash for 5 minutes at room temperature, and then placed into an oven at a variety of conditions as set forth in Table 4. The dry film build varied as set forth in Table 4. The sample was then removed, and allowed to air cool until it reached room temperature, prior to application of topcoats.

Two topcoat systems were tested: XPB21920VS basecoat along with SPU30019 Soft Touch Clearcoat and XPB22362VS basecoat along with XPC70031 U.V. High Gloss clearcoat system, each available from PPG Industries. Application and processing were similar to previous negative control Examples #3 and #5.

EXAMPLE 8

A 2-component coating composition was prepared as follows: In Step 1, a mixture of 1 part resorcinol and 2 parts benzyl alcohol was prepared in a 2 oz. jar. The jar was sealed and hand mixing was required to dissolve the resorcinol into the benzyl alcohol. The solution was clear after 15 minutes of hand-shaking. In Step 2, a mixture of 20 parts of DP90LF and 10 parts of DP401LF was prepared in a 2 oz. jar. The 2 oz. jar was then sealed and the contents mixed vigorously for ~1 minute. The solution was compatible and free of any particulates. In Step 3, 5 parts of the mixture of Step 1 was added to 30 parts of the mixture of Step 2 and the resulting mixture was vigorously shaken for ~1 minute. The solution was compatible and free of any particulates.

Using a Binks 95 gun, with a line pressure of 50 psi, the preceding composition was spray applied onto IXEF 1622, IXEF1022, Grivory GV-5H, and Zytel HTN53G50HSLR nylon test panels that had previously been wiped with isopropanol and allowed to dry thoroughly. The coated sample was allowed to air-flash for 5 minutes at room temperature, and then placed into an oven at a variety of conditions as set forth in Table 4. The dry film build varied as set forth in Table 4. The sample was then removed, and allowed to air cool until it reached room temperature, prior to application of topcoats.

Two topcoat systems were tested: XPB21920VS basecoat along with SPU30019 Soft Touch Clearcoat and XPB22362VS basecoat along with XPC70031 U.V. High Gloss clearcoat system, each available from PPG Industries. Application and processing were similar to previous negative control Examples #3 and #5.

Test Results

Results are set forth in Tables 1 through 4. All adhesion tests were conducted using the ASTM D3359 Method B using four pulls of 3M 610 tape. Eleven cuts were made in each direction creating one mm squares. The results are reported as: 5B=perfect adhesion, no delamination; 4B=small flakes detach, less than 5% of the area is affected, no full square is lost; 3B=5% to 15% delamination; 2B=15% to 35% delamination, 1B=35% to 65% delamination; and 0B=>65% delamination. Visual inspection was done after the fourth tape pull. Comments are made only if the delamination was basecoat to clearcoat, but still recorded as delamination using the ASTM 3359 Method B protocol. Initial adhesion was conducted randomly on the panels. Adhesion testing after humidity exposure was conducted randomly on the panels. Humidity testing was conducted for 120 total hours, with a 12 hour cycle at 55° C. and 95% relative humidity, and the other 12 hour cycle at 25° C. at 95% humidity. Adhesion after the humidity cycle was conducted after approximately 1 hour at ambient conditions.

TABLE 1

| Substrate | Example #1 | Example #2 |
|---|---|---|
| IXEF 1622 | 0B - after only 1 tape pull | 5B |
| IXEF 1022 | 0B - after only 1 tape pull | 5B |

TABLE 2

| | Example #3 | | Example #4 | |
|---|---|---|---|---|
| Substrate | Initial Adhesion | Adhesion after Humidity | Initial Adhesion | Adhesion after Humidity |
| IXEF 1622 | 0B - after only 1 tape pull | Not Tested | 5B | 5B |
| IXEF 1022 | 0B - after only 1 tape pull | Not Tested | 5B | 5B |
| GV-5H | 0B - after only 1 tape pull | Not Tested | 5B | 5B |

TABLE 3

| | Example #5 | | Example #6 | |
|---|---|---|---|---|
| Substrate | Initial Adhesion | Adhesion after Humidity | Initial Adhesion | Adhesion after Humidity |
| IXEF 1622 | 0B - after only 1 tape pull | Not Tested | 4B-3B | 4B-3B |
| IXEF 1022 | 0B - after only 1 tape pull | Not Tested | 4B-3B | 4B-3B |
| GV-5H | 0B - after only 1 tape pull | Not Tested | 4B-3B | 4B-3B |

TABLE 4

| | Ex #7 | Ex #7 | Ex #7 | Ex #7 | Ex #8 | Ex #8 | Ex #8 | Ex #8 |
|---|---|---|---|---|---|---|---|---|
| Primer Bake Temp (° F.) | 140 | 180 | 140 | 180 | 140 | 180 | 140 | 180 |
| Primer Bake Time (min) | 30 | 10 | 10 | 30 | 30 | 10 | 10 | 30 |
| Primer Thickness (mil) | 0.5 | 0.5 | 1.0 | 1.0 | 0.5 | 0.5 | 1.0 | 1.0 |
| Substrate | XPB21290VS/SPU30019 Soft Touch Topcoat | | | | | | | |
| HTN53G50HSLR | 3B | 3B | 4B | 4B | 4B | 4B | 4B | 4B |
| IXEF 1622 | 0B | 0B | 2B | 0B | 4B | 4B | 4B | 4B |
| IXEF 1022 | 4B | 4B | 5B | 4B | 4B | 4B | 4B | 4B |
| GV-5H | 4B | 4B | 5B | 4B | 4B | 4B | 4B | 4B |
| LV-5H | 0B | 0B | 1B | 0B | 2B | 4B | 3B | 3B |
| Substrate | XPB22362VS/XPC70031 U.V. High Gloss Topcoat | | | | | | | |
| HTN53G50HSLR | 4B | 4B | 4B | 4B | 3B | 4B | 5B | 5B |
| IXEF 1622 | 0B | 3B | 4B | 4B | 4B | 3B | 5B | 5B |
| IXEF 1022 | 4B | 4B | 4B | 4B | 3B | 3B | 5B | 5B |
| GV-5H | 4B | 4B | 4B | 4B | 3B | 3B | 5B | 5B |
| LV-5H | 4B | 4B | 4B | 4B | 1B | 1B | 5B | 5B |

EXAMPLE 9

In a 2 oz. jar, a mixture of 1 part resorcinol was added to 2 parts of the materials listed in Table 5. The jar was sealed and hand mixing was required to dissolve the resorcinol. The mixture was then placed, as a small drop, onto IXEF1622 substrate, and visual measurements were taken to determine if the substrate was being etched. After 5 minutes, the sample was placed in an oven for 30 minutes at 180° F. Once the sample was removed, and cooled to room temperature, we visually inspected the substrate again for additional etching. Table #5 provides information on the etching observed at room temperature and at elevated temperature.

TABLE 5

| Solvent Added | After 5 Minutes at R.T. | After 30 min. at 180° F. |
|---|---|---|
| Benzyl Alcohol | Strong | Very Strong |
| Cyclohexanone | Strong | Very Strong |
| Butyl Carbitol | Weak | Fair |
| DiAcetone Alcohol | Strong | Strong |
| Methyl Isobutyl Carbinol | Strong | Strong |
| Ethyl Ethoxy Propionate | Strong | Very Strong |
| Ectasol DBE | Strong | Very Strong |
| Butyl Carbitol Acetate | Weak | Strong |
| n-butyl Propionate | Weak | Strong |
| Oxo-hexyl Acetate | Weak | Strong |
| n-butyl Acetate | Strong | Strong |
| n-Butanol | Strong | Strong |
| m-Pyrol | No Effect | No Effect |
| Water | Strong | Very Strong |
| Hexane Diol DiAcrylate | Weak | Fair |

EXAMPLE 10

A 2-component coating composition was prepared by mixing, in a 2 oz. Jar, 5 parts of XPM64550S Spectracron® SPU 500 White with 1 part of XPH80002 catalyst, both commercially available from PPG Industries. The 2 oz. jar was then sealed and the contents mixed vigorously for ~1 minute. The solution was compatible and free of any particulates. Spray application of the coating composition occurred within 60 minutes of such preparation Using a Binks 95 gun, with a line pressure of 55 psi, the preceding composition was spray applied onto various substrates as set forth in Table 6 that had previously been wiped with isopropanol and allowed to dry thoroughly. The coated sample was allowed to air-flash for 10 minutes at room temperature, and then placed into an oven for 30 minutes at 180° F. The dry film build was 1.0 to 1.5 mils. The sample was then removed from the oven and allowed to air cool until it reached room temperature, prior to initial adhesion testing.

EXAMPLE 11

A 2-component coating composition was prepared as follows: In Step 1, a mixture of 1 part zinc chloride and 5 parts benzyl alcohol was prepared in a 2 oz. jar. The jar was sealed and hand mixing was required to dissolve the zinc chloride into the benzyl alcohol. The solution was clear after 15 minutes of hand-shaking. In Step 2, a mixture of 50 parts of XPM64550S Spectracron® SPU 500 White, 18 parts of the mixture of Step 1, and 10 parts of XPH80002 catalyst was prepared in a 2 oz. jar. The 2 oz. jar was then sealed and the contents mixed vigorously for ~1 minute. The solution was compatible and free of any particulates. The solution was compatible and free of any particulates.

Using a Binks 95 gun, with a line pressure of 55 psi, the preceding composition was spray applied onto various substrates as set forth in Table 6 that had previously been wiped with isopropanol and allowed to dry thoroughly. The coated sample was allowed to air-flash for 10 minutes at room temperature, and then placed into an oven for 30 minutes at 180° F. The dry film build was 1.0 to 1.5 mils. The sample was then removed from the oven and allowed to air cool until it reached room temperature, prior to initial adhesion testing.

Test Results

Results are set forth in Tables 6. All adhesion tests were conducted using the ASTM D3359 Method B using four pulls of 3M 610 tape. Eleven cuts were made in each direction creating one mm squares. The results are reported as: 5B=perfect adhesion, no delamination; 4B=small flakes detach, less than 5% of the area is affected, no full square is lost; 3B=5% to 15% delamination; 2B=15% to 35% delamination, 1B=35% to 65% delamination; and 0B=>65% delamination. Visual inspection was done after the fourth tape pull. Initial adhesion was conducted randomly on the panels. Adhesion testing after humidity exposure was conducted randomly on the panels. Humidity testing was conducted for 120 total hours, with a 12 hour cycle at 55° C. and 95% relative humidity, and the other 12 hour cycle at 25° C. at 95% humidity. Adhesion after the humidity cycle was conducted after approximately 1 hour at ambient conditions.

TABLE 6

| Substrate | Example #10 | Example #11 |
|---|---|---|
| Grilamid ® TR 55 | Initial: 0B - after only 1 tape pull | Initial: 5B |
| | After Humidity: 0B - after only 1 tape pull | After Humidity: 4B-3B |
| Grilamid ® TR 90 | Initial: 0B - after only 1 tape pull | Initial: 5B-2B |
| | After Humidity: 0B - after only 1 tape pull | After Humidity: 2B |
| Grivory ® GV-5H | Initial: 0B - after only 1 tape pull | Initial: 5B |
| | After Humidity: 0B - after only 1 tape pull | After Humidity: 5B-4B |
| Grilamid ® XE 3915 | Initial: 0B - after only 1 tape pull | Initial: 0B |
| | After Humidity: 0B - after only 1 tape pull | After Humidity: 0B |
| Zytel ® HTN53G50 Black[1] | Initial: 0B - after only 1 tape pull | Initial: 5B |
| | After Humidity: 0B - after only 1 tape pull | After Humidity: 5B-4B |
| Zytel ® HTN53G50 Natural[1] | Initial: 0B - after only 1 tape pull | Initial: 5B |
| | After Humidity: 0B - after only 1 tape pull | After Humidity: 5B-4B |

[1]Thermoplastic polyamide commercially available from E. I. du Pont de Nemours and Company, Wilmington, Delaware.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A coating composition for a polymeric substrate comprising:
    (a) a film-forming resin;
    (b) a non-volatile organic chemical etchant; and
    (c) a solubilizing agent
    wherein the coating composition is substantially free of a vanadium oxide gel;
    wherein the film-forming resin does not comprise polyamide; and
    wherein the solubilizing agent and the non-volatile organic chemical etchant are present in the coating composition in a weight ratio of at least 1:1.

2. The coating composition of claim 1, wherein the composition is suitable for application to the polymeric substrate and components (b) and (c) and the substrate are selected so as to result in a Y value of no more than 2, wherein Y is calculated according to the following equation:

$$Y=-29.7+(0.28*A)+(-15.75*B)+(0.16*(A*C))+(0.30*(D*E)),$$

wherein:
A is the molecular weight of the solubilizing agent in units of g/mol;
B is the pair interaction energy between the solubilizing agent and the substrate in units of kcal/mol;
C is the pair interaction energy between the non-volatile organic chemical etchant and the solubilizing agent in units of kcal/mol;
D is the number of lone pair electrons in the solubilizing agent; and
E is the pair interaction energy between the non-volatile organic chemical etchant and the substrate in units of kcal/mol.

3. The coating composition of claim 2, wherein the substrate is a polyamide substrate.

4. The coating composition of claim 3, wherein the polyamide substrate is a reinforced polyamide substrate.

5. The coating composition of claim 2, wherein Y is no more than 1.6.

6. The coating composition of claim 1, wherein the film-forming resin comprises a thermoplastic film-forming resin.

7. The coating composition of claim 1, wherein the film-forming resin comprises a thermosetting film-forming resin.

8. The coating composition of claim 1, wherein the film-forming resin comprises radiation curable functional group(s).

9. The coating composition of claim 1, wherein the non-volatile organic chemical etchant comprises a non-volatile aromatic compound comprising an aromatic ring substituted with at least one hydroxy group and/or a hydroxy substituted substituent group.

10. The coating composition of claim 9, wherein the non-volatile organic chemical etchant comprises an isomer of benzenediol and/or an isomer of 4-methoxyphenol.

11. The coating composition of claim 10, wherein the isomer of benzene diol comprises 1,3 benzenediol.

12. The coating composition of claim 1, further comprising an inorganic metal salt.

13. The coating composition of claim 12, wherein the inorganic metal salt comprises zinc chloride.

14. The coating composition of claim 1, wherein the solubilizing agent comprises benzyl alcohol, cyclohexanone, ethyl ethoxy propionate, a dibasic ester, water, and/or a (meth)acrylate.

15. The coating composition of claim 1, wherein the solubilizing agent comprises benzyl alcohol and/or cyclohexanone.

16. The coating composition of claim 1, wherein the solubilizing agent and the non-volatile organic chemical etchant are present in the coating composition in a weight ratio of at least 1.5:1.

17. The coating composition of claim 1, wherein the solubilizing agent and the non-volatile organic chemical etchant are present in the coating composition in a weight ratio of at least 2:1.

18. The coating composition of claim 1, wherein the non-volatile organic chemical etchant is present in the coating composition in an amount of 15% to 99% by weight based on the total weight of resin solids in the coating composition.

19. The coating composition of claim 1, wherein the non-volatile organic chemical etchant is present in the coating composition in an amount of 15% to 65% by weight based on the total weight of resin solids in the coating composition.

20. A coating composition for a polymeric substrate comprising:
    (a) a thermosetting film-forming resin;
    (b) a non-volatile chemical etchant; and
    (c) a solubilizing agent
    wherein the coating composition is substantially free of a vanadium oxide gel; and
    wherein the solubilizing agent and the non-volatile chemical etchant are present in the coating composition in a weight ratio of at least 1:1.

21. The coating composition of claim 20, wherein the non-volatile chemical etchant comprises a non-volatile aromatic compound comprising an aromatic ring substituted with at least one hydroxy group and/or a hydroxy substituted substituent group.

22. The coating composition of claim 20, wherein the non-volatile chemical etchant comprises an inorganic metal salt.

23. The coating composition of claim 20, wherein the solubilizing agent comprises benzyl alcohol, cyclohexanone, ethyl ethoxy propionate, a dibasic ester, and/or a (meth)acrylate.

24. The coating composition of claim 20, wherein the thermosetting film-forming resin comprises an acrylic resin, a polyurethane resin, and/or and epoxy resin.

25. A method for improving the adhesion of a coating to a polymeric substrate comprising:
    (a) depositing a first coating directly to at least a portion of the substrate, wherein the first coating is deposited from a coating composition comprising:
        (i) a film-forming resin;
        (ii) a non-volatile organic chemical etchant; and
        (iii) a solubilizing agent
        wherein the coating composition is substantially free of a vanadium oxide gel;
        wherein the film-forming resin does not comprise polyamide; and
        wherein the solubilizing agent and the non-volatile organic chemical etchant are present in the coating composition in a weight ratio of at least 1:1; and
    (b) depositing a second coating directly over at least a portion of the first coating.

26. The method of claim 25, wherein components (ii) and (iii) and the substrate are selected so as to result in a Y value of no more than 2, wherein Y is calculated according to the following equation:

$$Y = -29.7 + (0.28*A) + (-15.75*B) + (0.16*(A*C)) + (0.30*(D*E)),$$

wherein:
A is the molecular weight of the solubilizing agent in units of g/mol;
B is the pair interaction energy between the solubilizing agent and the substrate in units of kcal/mol;
C is the pair interaction energy between the non-volatile organic chemical etchant and the solubilizing agent in units of kcal/mol;
D is the number of lone pair electrons in the solubilizing agent; and
E is the pair interaction energy between the non-volatile organic chemical etchant and the substrate in units of kcal/mol.

27. The method of claim 26, wherein Y is no more than 1.6.

28. The method of claim 25, wherein the substrate is a polyamide substrate.

29. The method of claim 28, wherein the polyamide substrate is a reinforced polyamide substrate.

30. The method of claim 25, wherein the non-volatile organic chemical etchant comprises a non-volatile aromatic compound comprising an aromatic ring substituted with at least one hydroxy group and/or a hydroxy substituted substituent group.

31. The method of claim 25, wherein the coating composition further comprises an inorganic metal salt.

32. The method of claim 25, wherein the solubilizing agent comprises benzyl alcohol, cyclohexanone, ethyl ethoxy propionate, a dibasic ester, water, and/or a (meth)acrylate.

33. The method of claim 25, wherein the solubilizing agent and the non-volatile organic chemical etchant are present in the coating composition in a weight ratio of at least 1.5:1.

34. The method of claim 33, wherein the solubilizing agent and the non-volatile organic chemical etchant are present in the coating composition in a weight ratio of at least 2:1.

* * * * *